S. M. FORD.
MACHINE FOR MAKING LATH BOARD.
APPLICATION FILED MAY 11, 1917.
1,257,472.
Patented Feb. 26, 1918.
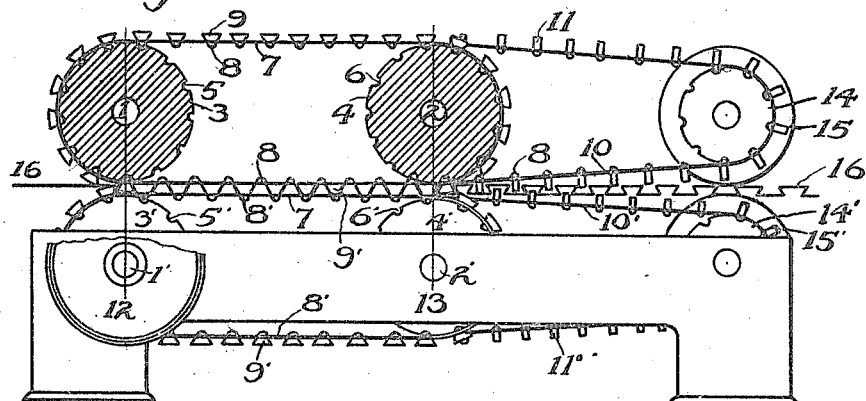
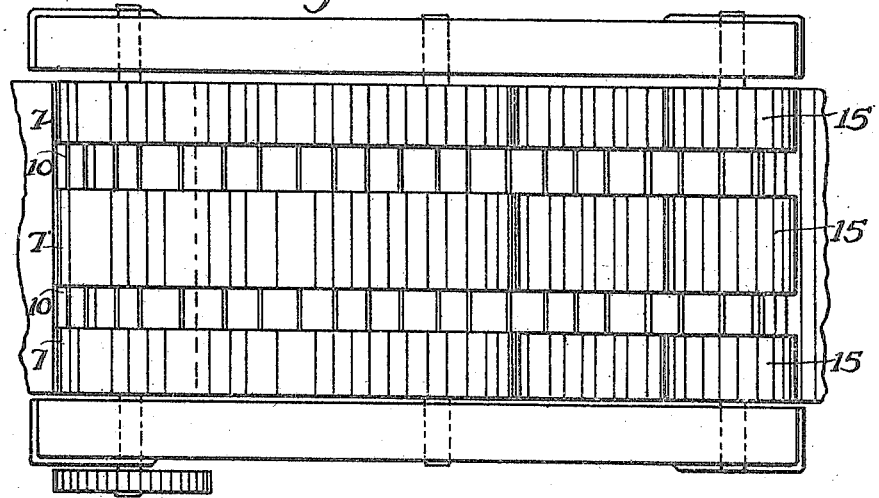
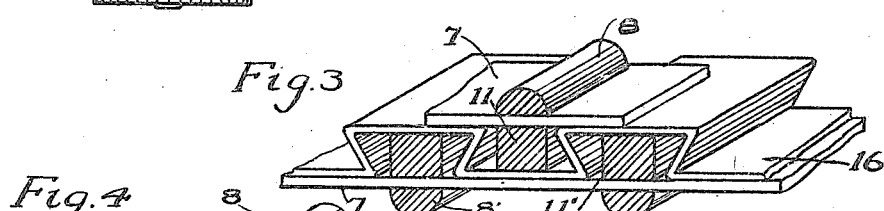
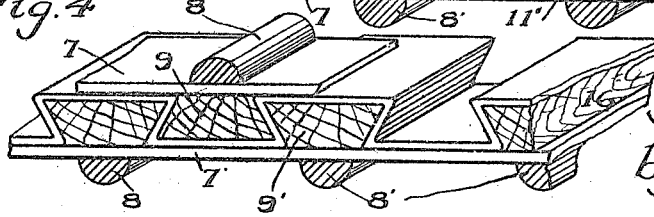
Inventor:
Silas M Ford
by C. D. Enochs
Attorney

UNITED STATES PATENT OFFICE.

SILAS M. FORD, OF ST. PAUL, MINNESOTA.

MACHINE FOR MAKING LATH-BOARD.

1,257,472.

Specification of Letters Patent.   Patented Feb. 26, 1918.

Application filed May 11, 1917.   Serial No. 168,055.

*To all whom it may concern:*

Be it known that I, SILAS M. FORD, a citizen of the United States, and a resident of St. Paul, in the county of Ramsey and State of Minnesota, have invented certain new and useful Improvements in Machines for Making Lath-Board, of which the following is a specification.

One object of my invention is to provide in a machine for making lath board, means for corrugating paper or other suitable material, and means for conveying the corrugated material from the corrugating means to gage rolls.

Another object of my invention is to provide in a machine for making lath board, means for corrugating material into a dove-tailed shape, and conveying means working in conjunction with the corrugating means for transferring the material in its corrugated shape to a point beyond the corrugating means.

Another object of my invention is to provide improved means for corrugating material into a dove-tailed shape.

With these and incidental objects in view, the invention consists of certain novel features of construction and combination of parts, the essential elements of which are hereinafter described with reference to the drawing which accompanies and forms a part of this specification.

In the drawing, Figure 1 is a sectional side elevation of a machine embodying my invention; Fig. 2 is a plan view of the same; Fig. 3 is an enlarged detail of the conveying means; and Fig. 4 is an enlarged detail of the corrugating means.

The machine embodying this invention is somewhat analogous to that disclosed in my allowed application for machine for making lath board, Serial No. 55352, filed October 11, 1915, but there are important improvements in the machine disclosed herein, and only the improved features will be described and claimed.

A pair of shafts 1 and 2, Fig. 1, carry a pair of rolls 3 and 4 having a series of flutes 5 and 6 cut across the faces of the rolls, and a similar set of shafts 1' and 2', carrying rolls 3' and 4' having flutes 5' and 6', are positioned adjacent to the first named set, as plainly shown in Fig. 1.

A series of belts 7, Figs. 1 and 2, carry on the inside thereof, half round cleats 8, and the outer side thereof, dove-tailed shaped cleats 9.

Spaced between the series of belts 7, Fig. 2, is a second series of belts 10, which carry on the inner side thereof, similar half rounds 8 and on the outer side thereof, spacing strips 11.

The shafts are driven in any suitable manner and the dove-tailed shaped cleats 9 and 9' co-act as described in my application aforesaid, forming the paper 16 into a corrugated shape, in which shape it is carried from the line 12 to the line 13, Fig. 1, and while the material across the strips 11 is not forced into the dove-tailed shape as it is across the faces of the cleats 9, the length of the strips 11 is comparatively short so that the material forms truly across these strips.

The belts 10 and 10', while they pass around the rolls 3 and 3' in the same manner as does the belt 7, do not pass around the rolls 2 and 2' but extend beyond these rolls and are carried by a third pair of rolls 14 and 14' respectively, similar to rolls 2 and 2' except that they are smaller in diameter.

It is evident that the strips 11 will be registered in the formed paper when it is corrugated, as shown in Fig. 4, the strips being positioned in the corrugated form intermediate of the corrugating cleats, as shown in Fig. 3, and during the travel of the paper from the line 12 to 13 these strips 11 and 11' are inactive.

As the cleats 9 and 9' roll out of the formed paper as the cleats pass the line 13, the spacing strips 11 and 11' hold the corrugations in their proper relation to each other and transfer the formed material to the pair of rolls 14.

Intermediate of the belts 10 the rolls 14 are of an enlarged diameter as shown at 15 and 15' and are so spaced that they form gage rolls that serve to bring the paper into the shape in which it was carried between lines 12 and 13, or it may even squeeze the corrugations somewhat more closely together.

The rolls 14 and 14', which carry the belts 10 and 10', are of a smaller diameter than the rolls 2 and 2' so that the strips 11 and 11' will lift out of engagement with the corrugations of the paper just as the gage rolls 15 and 15' take effect, thereby leaving the paper free for action by the gage rolls.

The paper is thus delivered as at 16 and it may be a finished product for some purposes in this condition, or it may be transferred from here to another machine for further operation such as reinforcing it with wire, etc.

While I have described my invention and illustrated it in one particular design, I do not wish it understood that I limit myself to this construction, as it is evident that the invention may be varied in many ways within the scope of the following claims.

Claims:

1. In a machine for making lath board, the combination of endless traveling means having thereon cleats for forming material into a corrugated shape, and conveying means traveling with said traveling means through a portion of its circuit for conveying material corrugated by said corrugating means from said corrugating means.

2. A conveyer for corrugated material comprising in combination an endless belt having spacing slats thereon spaced to correspond with the corrugations of the corrugated material, two rotative means spaced apart for carrying thereon said endless belt, one of said rotative means being of smaller diameter than the other of said rotative means.

3. In a machine for making lath board, the combination of a pair of endless belts associated together, each of said belts having thereon corrugating cleats for forming material into a corrugated shape, an endless conveyer belt traveling with one of said forming belts throughout a portion of its travel and leading to a point away from said forming belt, said conveyer belt having spacing cleats thereon corresponding with the corrugations of said material.

4. In a machine for making lath board, the combination of means for forming material into a dovetailed shape, a pair of gage rolls for forming said dovetailed material into a closer dovetailed shape and having conveying means from said forming means to said gage rolls for conveying the dovetailed material to said gage rolls, and means on said conveying means for maintaining said dovetailed material in substantially the shape into which it is dovetailed, said conveying means leaving said material as the latter enters between said gage rolls.

5. In a machine for making lath board, the combination of means for forming material into a corrugated shape, conveying means associated therewith for conveying material in its corrugated shape to a point spaced from said forming means, and means positioned adjacent to said named point for forming said corrugated material into a dovetailed shape.

6. In a machine for making lath board the combination of an endless traveling means having cleats thereon for forming material into a corrugated shape, conveying means traveling with said traveling means through a portion of its circuit for conveying material corrugated by said corrugating means from said corrugating means, and means for bringing said conveying means out of engagement with the corrugated material at a predetermined point.

SILAS M. FORD.

Copies of this patent may be obtained for five cents each, by addressing the "Commissioner of Patents, Washington, D. C."